US007734581B2

(12) United States Patent
Gu et al.

(10) Patent No.: US 7,734,581 B2
(45) Date of Patent: Jun. 8, 2010

(54) VECTOR READS FOR ARRAY UPDATES

(75) Inventors: Richard Yu Gu, Mountain View, CA (US); Ashish Thusoo, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 438 days.

(21) Appl. No.: 10/848,869

(22) Filed: May 18, 2004

(65) Prior Publication Data

US 2005/0262110 A1 Nov. 24, 2005

(51) Int. Cl.
*G06F 17/30* (2006.01)
(52) U.S. Cl. .................................... 707/610
(58) Field of Classification Search ............ 700/25
See application file for complete search history.

(56) References Cited

U.S. PATENT DOCUMENTS

| 4,785,400 | A | * | 11/1988 | Kojima et al. .............. 707/100 |
| 5,517,631 | A | * | 5/1996 | Machado et al. ............ 711/111 |
| 5,619,690 | A | * | 4/1997 | Matsumani et al. ......... 707/200 |
| 5,918,225 | A | * | 6/1999 | White et al. ................. 707/3 |
| 5,948,062 | A | * | 9/1999 | Tzelnic et al. .............. 709/219 |
| 6,032,219 | A | * | 2/2000 | Robinson et al. ............ 711/1 |
| 6,070,164 | A | * | 5/2000 | Vagnozzi .................... 707/100 |
| 6,321,234 | B1 | * | 11/2001 | Debrunner .................. 707/202 |
| 6,385,626 | B1 | * | 5/2002 | Tamer et al. ................ 707/203 |
| 6,466,942 | B1 | * | 10/2002 | Tolkin ........................ 707/102 |
| 6,772,155 | B1 | * | 8/2004 | Stegelmann .................. 707/8 |
| 7,080,081 | B2 | * | 7/2006 | Agarwal et al. ............. 707/100 |
| 2002/0103815 | A1 | * | 8/2002 | Duvillier et al. ............ 707/203 |
| 2002/0116573 | A1 | * | 8/2002 | Gold ........................... 711/111 |

OTHER PUBLICATIONS

J. Holt, "Predicting Multi-Block Read Call Sizes", hotsos journal, Jan. 3, 2000, pp. 1-2.
Oracle Articles: Difference between DBFile Sequential and Scattered Reads, "keeptool Tools for Oracle Databases", Apr. 23, 2003, pp. 1.

* cited by examiner

*Primary Examiner*—Neveen Abel Jalil
*Assistant Examiner*—Bai D Vu
(74) *Attorney, Agent, or Firm*—Silicon Valley Patent Group LLP; Omkar Suryadevara

(57) ABSTRACT

An array update operation which specifies number of (row-identifier, value) pairs for updating rows in a table of a database is implemented as follows. A block-identifier of a block (on disk) that holds a row identified by a row-identifier in a specified pair is looked up using a database index, and the block-identifier thus found is stored in a structure. Use of a row-identifier to look up the corresponding block-identifier, and the storage of the block-identifier in the structure are repeatedly performed, for each of several specified pairs. Next, a vector read is performed, to read and store in a cache, each block identified by a block-identifier in the structure, and all the blocks that have been read are stored in the cache during a single function call. Thereafter, rows identified in specified pairs are modified, in blocks currently in the cache, using the values in the specified pairs.

23 Claims, 4 Drawing Sheets

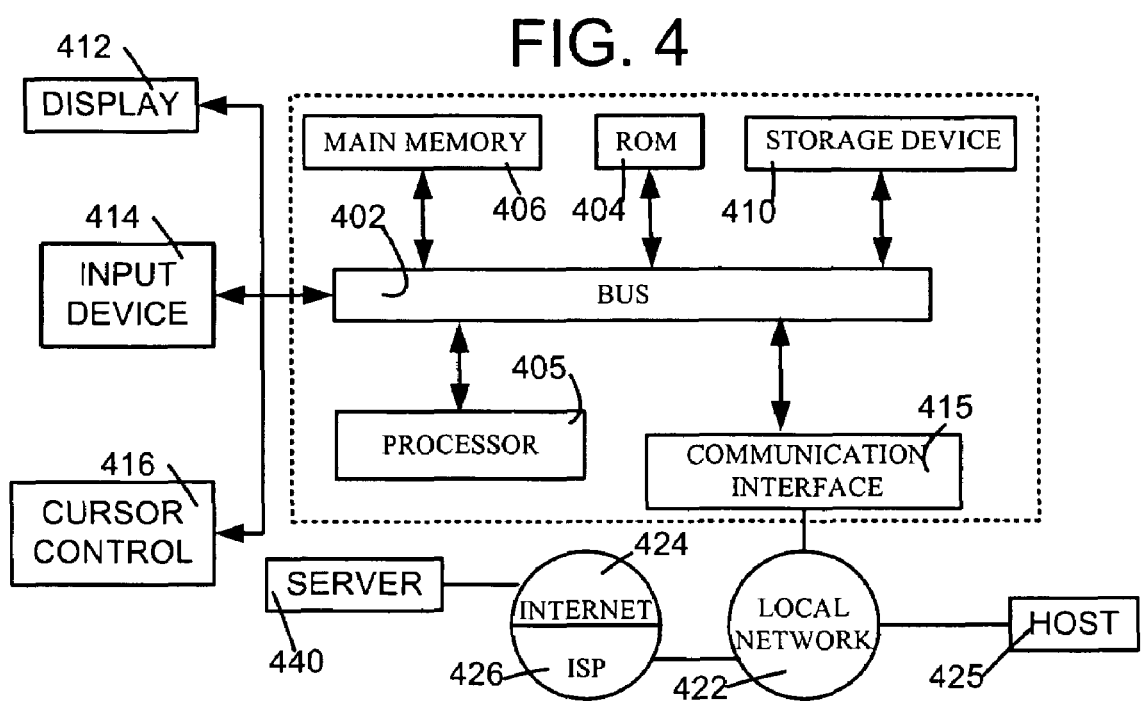

VECTOR READS FOR ARRAY UPDATES

BACKGROUND

In certain prior art, a multi-row update (also called "array update") of a table T in a relational database (such as Oracle) is specified by an array (A) of row-identifier(ID) and value(V) pairs. An example of such an update is to change in an Address table the area code from 703 to 571 in all rows wherein the zip is 22313. An SQL query for such an multi-row update, when presented to a database management system, is first parsed, followed by pre-execute processing (e.g. error checking to confirm table names and column names, code generation and optimization). Thereafter, the database management system enters a loop, for each ID and V pair in A to do the following:

```
{Initialization( ); FindBlock(ID); FetchBlock( );
    UpdateRow(V)}.
```

In the above prior art loop, on each iteration, a single block B is individually identified as containing a value V to be updated by use of the identifier ID, by a function FindBlock. Function FindBlock typically uses a database index which may be, for example a B-Tree index or a hash index of the type well known in the art. Regardless of how the block is identified, the next step is to fetch the identified block B, which is performed by the function FetchBlock( ). Specifically, function Fetch-Block looks up block B in memory (in an area called "buffer cache"), and if block B is not in memory, then a disk access is performed to bring block B into memory. Once the block B is in memory (in the buffer cache), then function FetchBlock returns block B. Thereafter, the value V is updated, in the function UpdateRow, and then the next iteration is performed.

During the next iteration, a next row that needs to be updated may or may not be contained in the same block B. If the next row to be updated is contained in a different block, such a different block is unlikely to be the very next block on the disk from which block B was read (unless all rows are being updated). Hence, prior art systems that automatically prefetch into the buffer cache, a block that is very next to block B that has been just read, are not effective in anticipating and servicing the needs of an array update operation.

SUMMARY

In accordance with the invention, a database management system uses multiple row-identifiers (specified in an array update operation) with a database index, to find and pre-fetch into a buffer cache a number of blocks that are known to contain one or more to-be-updated rows. Pre-fetching of such blocks that are known to contain to-be-updated rows has the advantage of more effectively using the buffer cache than prior art systems (which simply pre-fetch a block, not knowing whether or not it contains a to-be-updated row).

Specifically, a database index is used in many embodiments of the invention to find and store in a structure a number of block-identifiers of blocks (on disk) that are known to hold rows identified by row-identifiers specified in the array update operation. Finding and storing of a block-identifier are repeatedly performed for several row-identifiers, e.g. to fill up the structure or for all row-identifiers specified in the array update operation.

Next, also in accordance with the invention, a number of blocks that are identified by their corresponding block-identifiers in the above-described structure are read from disk (if necessary) and are stored in the buffer cache. In many embodiments, numerous identified blocks are read from disk in a single operation (variously called vector read, or scattered read, depending on the database management system).

Thereafter, multiple rows specified in the array update operation are updated in the normal manner, and the update happens locally within blocks currently in the buffer cache, using values specified in the array update operation. Blocks that have been updated are written to disk in the normal manner (e.g. unpinned, but flushed to disk only when space is needed).

BRIEF DESCRIPTION OF THE DRAWINGS

FIG. 4 illustrates, in a high level block diagram, hardware included in a computer that may be used to perform the methods of FIGS. 2 and 3 in some embodiments of the invention.

DETAILED DESCRIPTION

Figure 1:
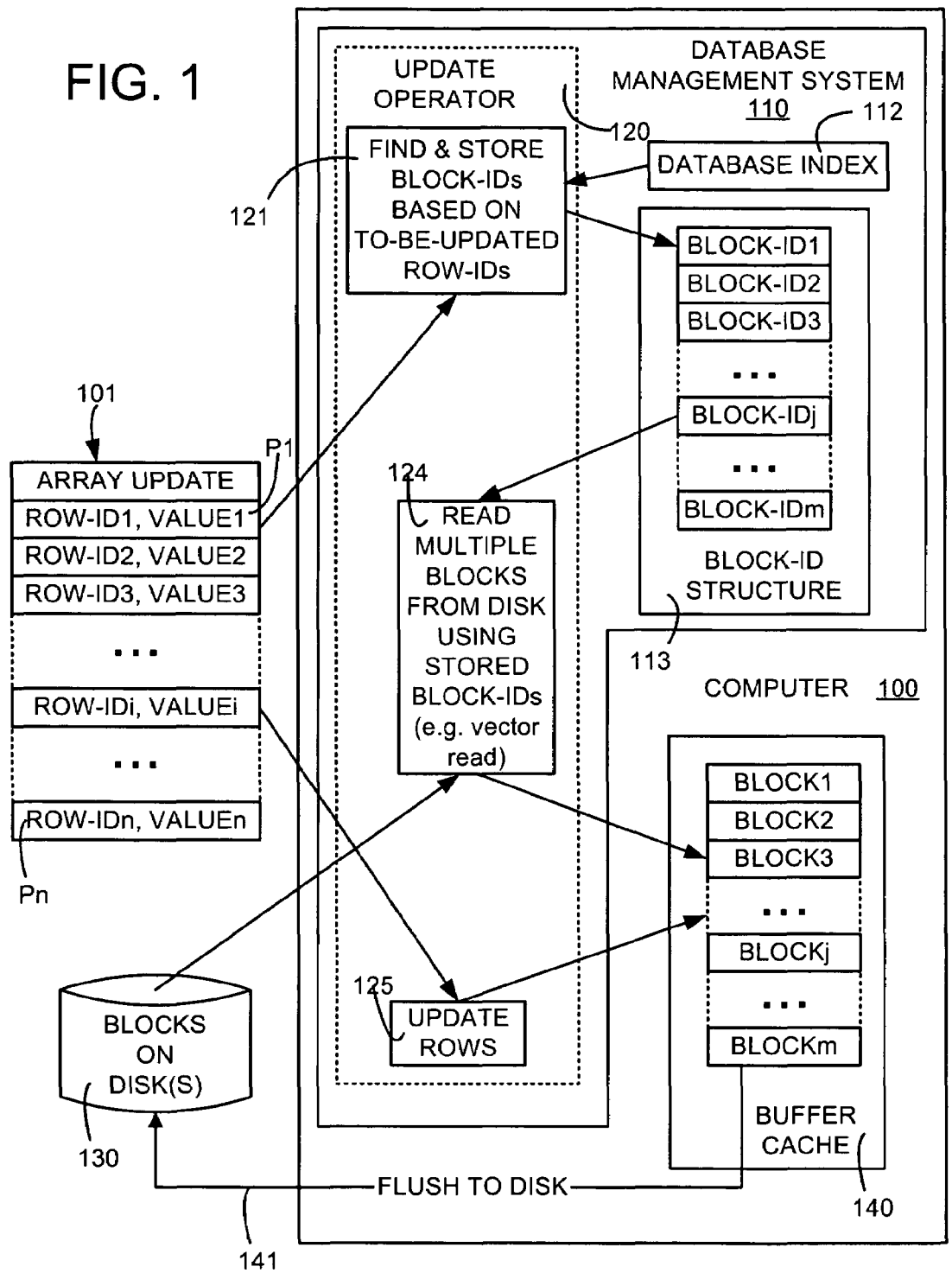
FIG. 1 illustrates, in a block diagram, a database management system in accordance with the invention that finds and stores block-identifiers of to-be-updated rows in a structure, uses a vector read to fetch from disk into buffer cache numerous blocks identified in the structure, and thereafter updates rows.

An array update operation 101 (FIG. 1) which specifies several (row-identifier, value) pairs P1 . . . Pn for updating multiple rows identified by the respective row-identifiers ROW-ID1 . . . ROW-IDn in a table of a relational database (such as Oracle) is implemented by a database management system 110 in a computer 100 in many embodiments of the invention as follows. Note that the syntax of array update operation 101 to be implemented in accordance with the invention conforms to conventional syntax, and this operation 101 may be generated in the normal manner (e.g. via an SQL UPDATE query).

Database management system 110 in accordance with the invention includes an update operator 120 that finds, and stores in structure 113 (FIG. 1), a number of block identifiers BLOCK-ID1 . . . BLOCK-IDm that identify a corresponding number of blocks known to contain rows to be updated in array update operation 101. Note that block identifiers BLOCK-ID1 . . . BLOCK-IDm of some embodiments may have a format that identifies one or more fields of a physical address as follows: disk identifier, file name, file offset and number of bytes. Note that BLOCK_ID of one embodiment is just an integer that uniquely identifies a disk block logically. The logical identity is then converted by a layer of software to the physical disk block address. The specific manner in which the logical identity is converted into a physical address is not a critical aspect of this invention.

Structure 113 (FIG. 1) can be implemented as any data structure in memory (e.g. main memory) that can hold a number of identifiers of blocks, e.g. an array of disk addresses may be used. The number of blocks "m" that are stored in structure 113 may depend on the size of structure 113 or on the number of row identifiers in array update operation 101, or both, depending on the embodiment. In one embodiment, the number "m" is selected to be same as the number of blocks that can be held in a buffer cache 140 (described below), although in other embodiments these numbers may be related in other ways, or even unrelated to one another (in one embodiment).

To find the block identifiers to be stored in structure 113, update operator 120 (FIG. 1) of some embodiments includes software 121 that uses a database index 112 in the normal manner. Database index 112 may be a B-Tree or a hash cluster index of the type well known in the art. As will be apparent to the skilled artisan in view of this description, any type of index well known in the prior art can be used for row identification as described herein.

In a first illustrative embodiment, table data of system 110 is stored in clusters. A cluster is a group of tables that share the same data blocks because they share common columns and are often used together. For example, two tables namely an employees table and a departments table may share the department_id column. When the employees table and the departments table are clustered, system 110 physically stores all rows for each department from both the employees table and the departments tables in the same data blocks.

In the just-described first illustrative embodiment, a cluster key value is the value of the cluster key columns for a particular row. Each cluster key value is stored only once each in the cluster and the cluster index, no matter how many rows of different tables contain the value. Therefore, less storage is required to store related table and index data in a cluster than is necessary in nonclustered table format. In the above-described example, each department_id (which forms the cluster key) is stored just once for many rows that contain the same value in both the employees table and departments tables. Note that the just-described cluster is also referred to as an index cluster to distinguish it from a hash cluster which is discussed next.

In a second illustrative embodiment, system 110 uses hash clusters as follows. Hash clusters group table data in a manner similar to regular index clusters of the first illustrative embodiment (with clusters keyed with an index rather than a hash function). However, a row is stored in a hash cluster based on the result of applying a hash function to the row's cluster key value. All rows with the same key value are stored together on disk. Hash clusters are a better choice than using an indexed table or index cluster when a table is queried frequently with equality queries (for example, return all rows for department 10). For such queries, the specified cluster key value is hashed by system 110. The resulting hash key value points directly to the area on disk that stores the rows.

To use hashing, in the second illustrative embodiment, the user creates a hash cluster and loads tables into the cluster. System 110 physically stores the rows of a table in a hash cluster and retrieves them according to the results of a hash function. Sorted hash clusters allow faster retrieval of data for applications where data is consumed in the order in which it was inserted. System 110 uses a hash function to generate a distribution of numeric values, called hash values, which are based on specific cluster key values. The key of a hash cluster, like the key of an index cluster, can be a single column or composite key (multiple column key). To find or store a row in a hash cluster, system 110 applies the hash function to the row's cluster key value. The resulting hash value corresponds to a data block in the cluster, which system 110 then reads or writes on behalf of the issued statement. A hash cluster is an alternative to a nonclustered table with an index or an index cluster. With an indexed table or index cluster, system 110 locates the rows in a table using key values that system 110 stores in a separate index.

Update operator 120 of several embodiments also includes software 124 that uses the block identifiers in structure 113 to read the corresponding blocks from disk(s) 130, and store the blocks that have been read in buffer cache 140. While reading of blocks BLOCK1-BLOCKm from disk 130 may be performed by reading each block BLOCKj individually, several embodiments of the invention perform a single disk access operation to read all of BLOCK1-BLOCKm into buffer cache 140.

Depending on the operating system, the single disk access operation is variously called vector read, or scattered read. Regardless of the name used, the just-described single disk access operation is implemented in such embodiments, to read a number of blocks BLOCK1-BLOCKm from disk. Specifically, the call to such a function provides a number of pairs of (a) an offset in the file from where reading of data is to begin and (b) the number of bytes to be read. Such a function call may require additional arguments, such as a file descriptor that identifies the file from which the bytes are to be read, and a list of pointers to buffers where the data being read from each offset is to be stored in memory.

Buffer cache 140 that is used in most embodiments of the invention has conventional structures and functions, except for the difference in usage to hold pre-fetched blocks for an array update as noted herein. Specifically, buffer cache 140 is implemented in a portion of main memory of computer 100 that is reserved for caching data blocks from disk 130. More specifically, when a user requests a data block from disk 130 using a read( ) system call, the user-specified block is first looked up in buffer cache 130 and, if not there, it is fetched from disk 130 into buffer cache 140. From buffer cache 140, the block is typically copied into a user-space memory location.

Embodiments that fetch and store certain identified blocks BLOCK1-BLOCKm that are known as being about to be used, in updating the rows identified by the respective row-identifiers ROW-ID1 . . . ROW-IDn, use buffer cache 140 more effectively than prior art systems. Moreover, embodiments that fetch the identified blocks BLOCK1-BLOCKm in a single disk access operation, are more efficient by virtue of using only a single system call without context switching (as opposed to a prior art system that uses multiple system calls, one for each block being read from disk). Also, the time for a seek operation on disk 130 is spread across a number of blocks "m" being read, thereby making the single disk access operation faster than a number of individual disk access operations (one for each block).

Update operator 120 of many embodiments also includes software 125 that updates rows for an array update operation 101 in the normal manner. However, since software 124 (described above) has already pre-fetched the blocks that are to be used in updating the rows, software 125 executes much faster. Specifically, software 125 updates rows identified by the respective row-identifiers ROW-ID1 . . . ROW-IDn locally within blocks BLOCK1-BLOCKm currently in buffer cache 140, using values VALUE1-VALUEn specified in the array update operation 101.

Blocks that have been updated as described above are written to disk 130 in the normal manner. Specifically, after all rows in a block BLOCKj have been updated, that block BLOCKj is unpinned, but not flushed to disk 130. Instead, the block BLOCKj is flushed to disk 130 via a disk write operation 141 (FIG. 1) only when the space occupied by an unpinned block BLOCKj is needed by another block being fetched into buffer cache 140.

The above-described three pieces of software 121, 124 and 125 may be implemented in a method 200 (FIG. 2) in some embodiments of the invention. Specifically, in act 201, method 200 finds one block identifier BLOCK-IDj by using a corresponding row identifier ROW-IDi with the database index 112. Next, in act 202, method 200 stores the block identifier BLOCK-IDj in structure 113. These two acts 201 and 202 are repeated "m" times (e.g. 50 times) as per branch 218 in FIG. 2, if the number of row identifiers "n" is greater than "m".

Next, in act 203, method 200 performs a vector read operation, using all of block identifiers BLOCK-ID1 . . . BLOCK-IDm. As noted above, in many embodiments this is a single disk access operation, and on completion of this operation buffer cache 140 contains the corresponding blocks BLOCK1 . . . BLOCKm. Note that in some embodiments, the vector read operation (also called "scattered read") handles the above-described blocks at a logical level and an additional layer of software (called "space/data layer") is knowledgeable about these blocks at the physical level. The space/data layer may implement a vector read in any manner well known in the art.

In one specific embodiment, the vector read operation is implemented by the space/data layer invoking a low-level function called "readv( )" available in some operating systems for direct disk access. When calling function readv( ), space/data layer identifies as the base address the starting address of a first block to be read, and identifies as an offset the difference between the base address and the address of the last byte in the last block to be read. Note that in giving such a large offset, one or more blocks that are not needing to be read but happen to be located between non-contiguous to-be-read blocks are also read.

Also, when calling function readv( ), space/data layer identifies a number of buffer addresses that are equal to the number of blocks to be read. The buffer addresses for to-be-read blocks are specified to be corresponding addresses in the buffer cache. Buffer addresses for not-to-be-read blocks are specified to be addresses not in the buffer cache, e.g. addresses in a scratch area in memory. Furthermore, the space/data layer of some embodiments groups the blocks into batches according to their relative location. Blocks close to each other (in their physical addresses) are grouped into the same batch and a readv( ) function call is issued for each batch.

After act 203 (FIG. 2), in act 204, method 200 repeatedly performs row updates and as noted above, all updates happen within buffer cache 140. Note that the number of row updates "x" may be same as or greater than the number of blocks "m" because a given block may contain more than one row that is being updated. To handle the presence of multiple to-be-updated rows within a block, some embodiments, after identifying the block in act 201 perform an additional act of de-duplicating the block-identifiers (e.g. prior to storage in structure 113).

Also at the time of storage in act 202, several embodiments sort the block-identifiers BLOCK-ID1 . . . BLOCK-IDm, so that the block-identifiers are presented in an appropriate order to the disk drive, to reduce the time required by the head of the drive to move from one block to a next block (e.g. blocks that are physically adjacent to one another at the periphery of the disk are presented at one time whereas blocks that are physically adjacent to one another but located closer to the center of the disk are presented at another time). Note that the just-described sorting is useful primarily in embodiments wherein a block's logical address (in the form of block-identifiers BLOCK-ID1 . . . BLOCK-IDm) has a correspondence to the block's physical address, so that sorting of addresses at the logical level is almost as effective (or equally as effective) as sorting at the physical level.

After act 204 is performed, method 200 checks (in act 205) whether or not all the rows specified in array update operation 101 (FIG. 1) have been performed. If so then method 200 terminates (returns to a calling function) as per act 206. However, if not all rows in operation 101 have been performed then control loops back to act 201. In several embodiments, the number of such loops (from act 205 to act 201) depends on the ratio of the number of rows "n" in operation 101 divided by the number of blocks "m" that can be held in buffer cache 140. For example, if 'm' is 50 and 'n' is 100, then the number of transfers from act 205 to act 201 is just once (because only two iterations are needed (of acts 201, 202, 203 and 204).

Figure 2:
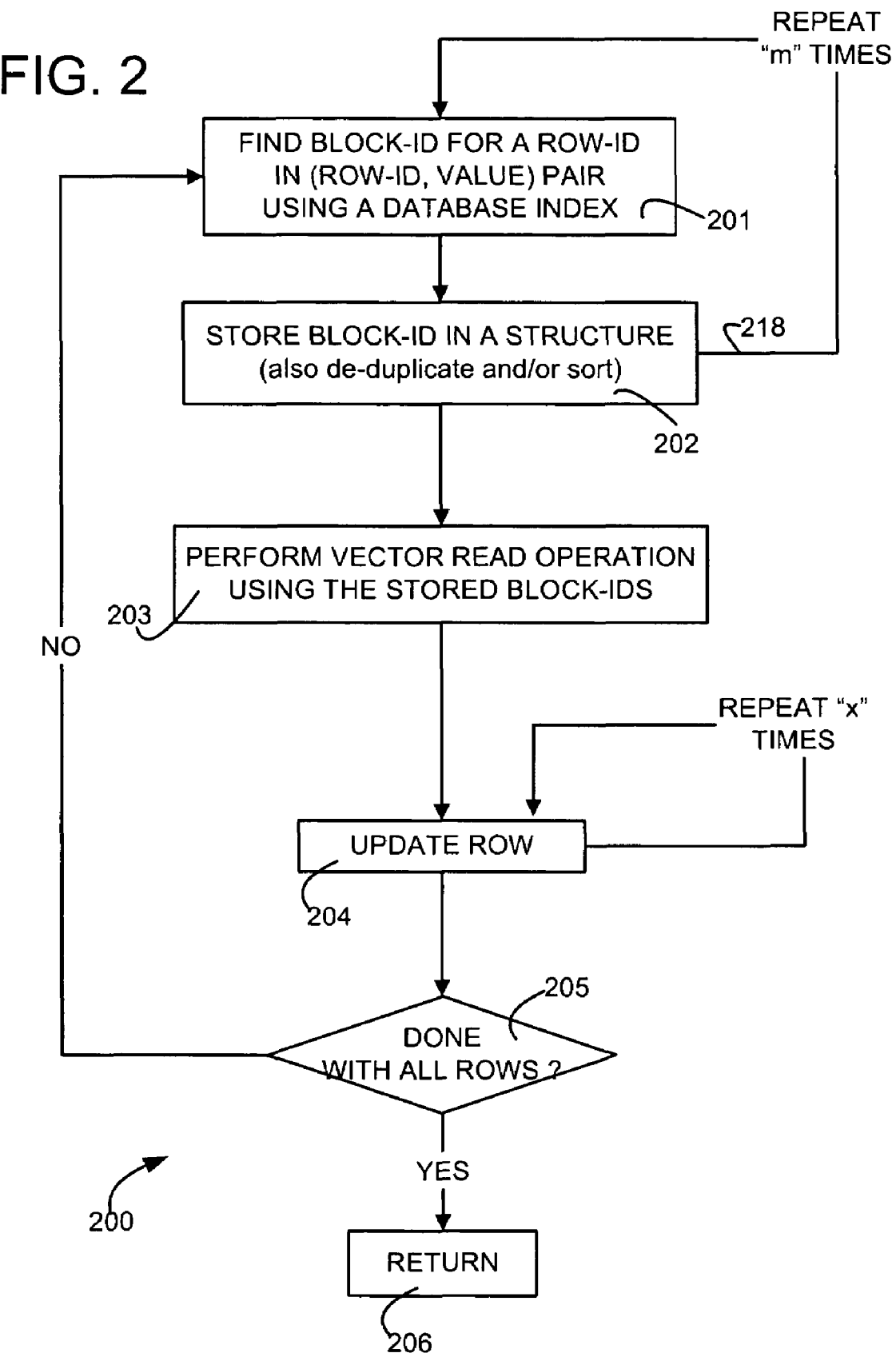
FIG. 2 illustrates, in a high-level flow chart, acts performed by an update operator in some embodiments of the invention.
Figure 3:
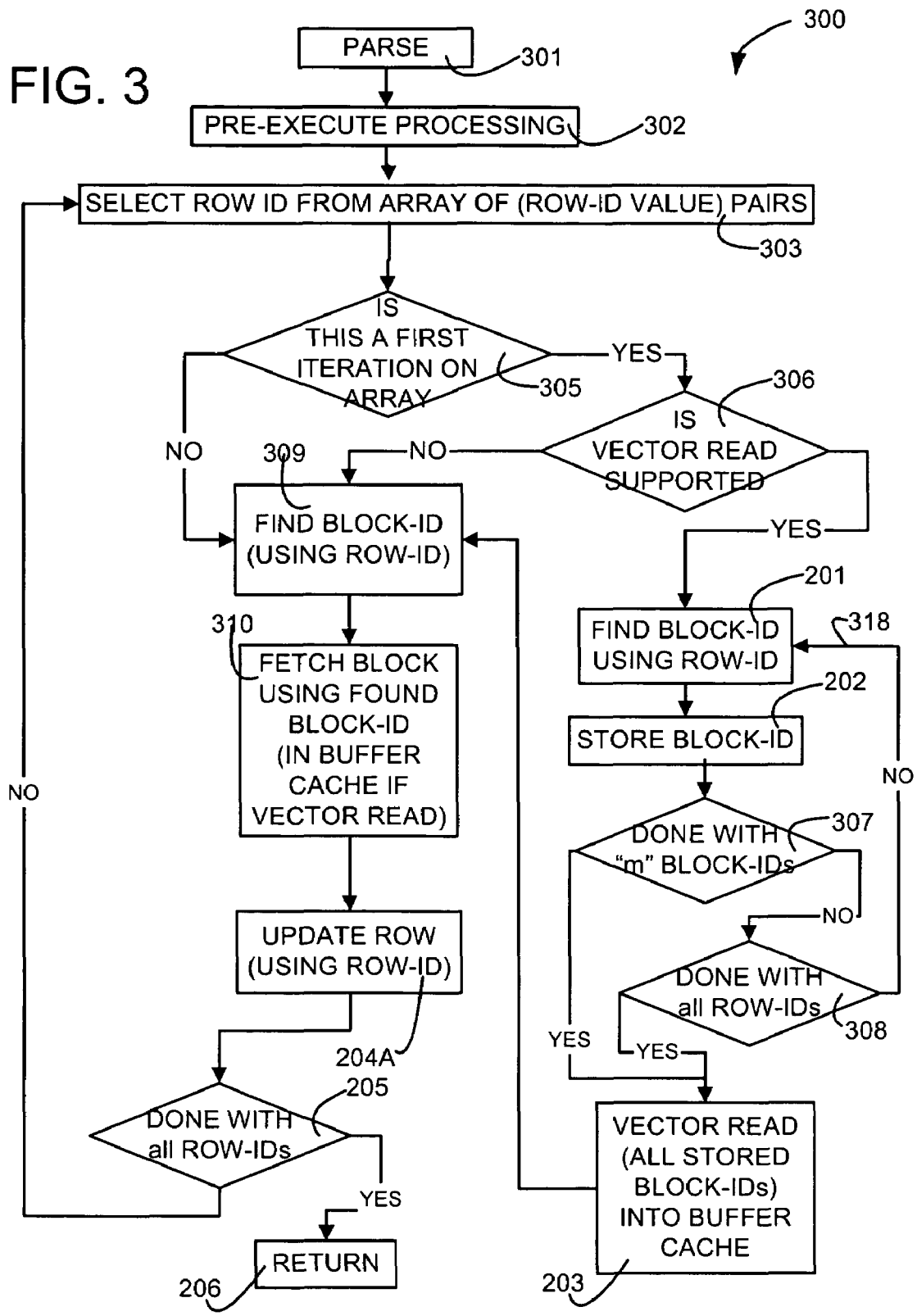
FIG. 3 illustrates, in a detailed flow chart, acts performed by one specific embodiment of the type illustrated in FIG. 2.

One exemplary embodiment of update operator 120 (FIG. 1) is illustrated by method 300 (FIG. 3). Method 300 provides an improvement over a simplistic implementation of method 200 of FIG. 2 by unrolling a first step of a loop to update rows, so that information prepared for updating the first row does not need to be re-created. Specifically, acts 201-203 that are illustrated in FIG. 2 as being located outside of the update row act 204 are pushed therein as discussed next.

Certain details illustrated in FIG. 3 are merely illustrative of an implementation that uses above-described acts 201-205 in one specific embodiment, and other such details will be present in other embodiments. Referring to FIG. 3, in act 301, method 300 parses the SQL query in the normal manner. Next, in act 302, pre-execute processing is performed also in the normal manner. Thereafter, in act 303, one row identifier is selected from the array of row identifier and value pairs that are provided in array update operation 101.

Next, in act 305, method 300 checks if this current act is a first iteration for the array. If so, then method 300 further checks, in act 306 whether or not vector read is supported. Note that this act 306 may be skipped in embodiments that are built for specific operating systems that are known to support (or not support) vector read. Next, if vector read is supported, then method 300 performs acts 201 and 202 which have been described above in reference to FIG. 2.

After act 202 in this embodiment, the above-described repetition (via branch 218 in FIG. 2) is not performed, and instead a different branch 318 is performed as discussed next. Specifically, after act 202, method 300 performs act 307 to check if "m" block identifiers have been stored in structure 113, and if so goes to act 203 (described above). If the answer in act 307 is no then method 300 goes to act 308 to check if all row identifiers in the array update operation 101 have been processed and if so goes to act 203. If the answer in act 308 is no then method 300 loops back to act 201 via branch 318.

As shown in FIG. 3, a number of acts 309, 310 and 204A are performed after act 203 and also if the answer is no in act 306. Regardless of the manner in which act 309 is reached, note that information prepared during initialization act 304 is now used in act 309, without being re-generated. Such use of initialization information eliminates extra steps (to re-generate initialization information) that would be otherwise required in a simplistic implementation.

Specifically, in act 309, method 300 finds one block identifier, using the first row identifier specified in array update operation 101. Note that act 309 of this embodiment repeats the "finding" which was done in act 201, for the first row identifier. Next, in act 310, the block identifier found in act 309 is used to fetch the first block. As noted above, in case of a vector read (i.e. if act 203 was performed in reaching act 310), the first block is fetched from the buffer cache. However, if vector read is not supported (e.g. if act 310 was reached via the "no" branch out of act 306), then the first block may be fetched either from the buffer cache or from disk. Next, in act 204A, the first row is updated, in a manner similar or identical to act 204 (described above). If the answer is no in act 305, then acts 309, 310 and 204A are performed in the manner noted above, except that the selected row identifier is different.

After acts 204A and 204B, act 205 is performed by method 300 in the above-described manner, and if there are more rows to be updated, then method 300 loops back to act 303 (described above). In some embodiments, the method further comprises writing a plurality of logs, at least one log for each row identified in the group of row-identifier and value pairs.

Computer 100 of FIG. 1A can be implemented by hardware that forms a computer system 400 as illustrated in FIG. 4. Specifically, computer system 400 includes a bus 402 (FIG. 4) or other communication mechanism for communicating information, and a processor 405 coupled with bus 402 for processing information. Computer system 400 also includes a main memory 406, such as a random access memory (RAM) or other dynamic storage device, coupled to bus 402 for storing information and instructions to be executed by processor 405. Main memory 406 also may be used for storing temporary variables or other intermediate information during execution of instructions to be executed by processor 405. Computer system 400 further includes a read only memory (ROM) 408 or other static storage device coupled to bus 402 for storing static information and instructions for processor 405. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 405. Another type of user input device is cursor control 416, such as a mouse, a trackball, or cursor direction keys for communicating direction information and command selections to processor 405 and for controlling cursor movement on display 412. This input device typically has two degrees of freedom in two axes, a first axis (e.g., x) and a second axis (e.g., y), that allows the device to specify positions in a plane.

As described elsewhere herein, vector reads for array updates are performed by computer system 400 in response to processor 405 executing one or more sequences of one or more instructions contained in main memory 406. Such instructions may be read into main memory 406 from another computer-readable storage medium, such as storage device 410. Execution of the sequences of instructions contained in main memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 405 for execution. Such a storage medium may take many forms, including but not limited to, non-volatile storage media, and volatile storage media. Non-volatile storage media includes, for example, optical or magnetic disks, such as storage device 410. Volatile storage media includes dynamic memory, such as main memory 406.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of computer readable storage media may be involved in carrying one or more sequences of one or more instructions to processor 405 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 405 retrieves and executes the instructions. The instructions received by main memory 406 may optionally be stored on storage device 410 either before or after execution by processor 405.

Computer system 400 also includes a communication interface 415 coupled to bus 402. Communication interface 415 provides a two-way data communication coupling to a network link 420 that is connected to a local network 422. Local network 422 may interconnect multiple computers (as described above). For example, communication interface 418 may be an integrated services digital network (ISDN) card or a modem to provide a data communication connection to a corresponding type of telephone line. As another example, communication interface 415 may be a local area network (LAN) card to provide a data communication connection to a compatible LAN. Wireless links may also be implemented. In any such implementation, communication interface 415 sends and receives electrical, electromagnetic or optical signals that carry digital data streams representing various types of information.

Network link 420 typically provides data communication through one or more networks to other data devices. For example, network link 420 may provide a connection through local network 422 to a host computer 425 or to data equipment operated by an Internet Service Provider (ISP) 426. ISP 426 in turn provides data communication services through the world wide packet data communication network 428 now commonly referred to as the "Internet". Local network 422 and network 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 415. In accordance with the invention, one such downloaded application provides for implementing vector reads for array updates in database management systems as described herein.

The received code may be executed by processor 405 as it is received, and/or stored in storage device 410, or other non-volatile storage for later execution. In this manner, computer system 400 may obtain application code in the form of a carrier wave.

Numerous modifications and adaptations of the embodiments described herein will be apparent to the skilled artisan in view of the disclosure. For example, although in some embodiments the acts of FIG. 2 are performed automatically by a programmed computer, in other embodiments one or more of such acts are performed by the computer under manual direction (by a human). Accordingly numerous such modifications and adaptations are encompassed by the attached claims.

Appendix A

Pseudo-Code

In the following function description, a table T is updated with an array (A) of identifier(ID) and value(V) pairs.

```
integer BID_A [50]            /* BID_A is an integer array */
Parsing( )                    /* Transforming the SQL statement
                                 into in memory */
                              /* representations for execution */
Pre Execute Processing( )     /* Setup the Update Process
                                 Environment for */
                              /* execution*/
                              /* Parsing & Pre-Execute are
                                 done only once */
LOOP1 Begin ( A )
  For each ID + V pair in A do the following
  {
    if (iteration 1)
    {
      if (VR is on)
      {
        LOOP2 Begin ( A )
          For each ID ± V pair in A do the following
          {
            Find Block(ID)
            Store Block ID(BID_A)
          }
        LOOP2 End
        Vector Fetch Blocks(BID_A)
      }
      Find Block(First ID)    /* Same as line 21 *1
      Fetch Block( )          /* but, find the block in cache &
                                 no disk read for Arrays*/
      Update Row(First V)
    }
    if (iteration > 1)
    {
      Find Block(ID)
      Get the Block in Cache( )
      Update Row(V)
    }
  }
LOOP1 End         /* end of loop1 */
Store Block ID (BID_A) =>
if (new block_id not in BID_A)
    add new block_id to BID_A
Vector Fetch Blocks(BID_A)=>
Sort BID_A
Scattered_read(BID_A) // all blocks now are read and are in the cache
```

What is claimed is:

1. A method implemented in a computer, the method comprising:

generating an array update operation based on a query to update a relational database;

wherein said array update operation specifies a plurality of row-identifier and value pairs to update multiple rows in a table of said relational database;

repeatedly finding, and storing in a structure, a block-identifier of a block that contains a row of data identified by a row-identifier in at least a group of row-identifier and value pairs in said plurality, by use of a database index prior to retrieval of the block;

wherein said structure is located in a memory of said computer;

wherein each value comprises data to be updated in said row identified by said row-identifier;

performing a single access operation without context switching, to retrieve from a storage device and to store in a cache, a plurality of blocks of data of said table, said blocks being identified by a corresponding plurality of block-identifiers in the structure;

wherein several of said blocks are non-contiguous in said storage device; and repeatedly updating, in blocks in the cache, each row identified in the group of row-identifier and value pairs, using a corresponding value in the row-identifier and value pairs; and sorting the block-identifiers, prior to retrieval of the blocks by performing the single access operation.

2. The method of claim 1 wherein: the sorting is performed subsequent to storage of the block-identifiers in the structure.

3. The method of claim 1 further comprising:

subsequent to said finding and prior to said storing, checking if the block-identifier has a duplicate already stored in the structure and if so then not storing the block-identifier in the structure.

4. The method of claim 1 further comprising, prior to updating:

repeating said finding of block-identifiers for all row-identifiers in the group of row-identifier and value pairs.

5. The method of claim 1 wherein: the table is organized in a hash cluster.

6. The method of claim 1 wherein:

the database index is a B-tree index.

7. The method of claim 1 wherein: said structure comprises an array; and the array has a plurality of entries identical in number to the plurality of blocks held in the cache.

8. The method of claim 1 further comprising:

writing a plurality of logs, at least one log for each row identified in the group of row-identifier and value pairs.

9. One or more storage media in which are stored instructions to perform a computer-implemented method, the instructions comprising:

instructions to generate an array update operation based on a query to update a relational database;

wherein said array update operation specifies a plurality of row-identifier and value pairs to update multiple rows in a table of said relational database;

instructions to repeatedly find and store in a structure, a block-identifier of a block that contains a row identified by a row-identifier in at least a group of row-identifier and value pairs in said plurality, by use of a database index of said relational database;

instructions to invoke performance of a single operation without context switching during said performance, to retrieve from a storage device and to store in a cache, a plurality of blocks, said blocks being identified by block-identifiers in the structure;

instructions to repeatedly update in blocks in the cache, each row identified in the group of row-identifier and value pairs, using a corresponding value in the row-identifier and value pairs;

wherein several of said blocks are non-contiguous in said storage device; and instructions to sort the block-identifiers, prior to retrieval of the blocks by performing the single operation.

10. The one or more storage media of claim 9 further comprising:

instructions to unpin each block after updating all rows in said each block; and instructions to flush an unpinned block to said storage device only when another block needs space in the cache occupied by the unpinned block.

11. The one or more storage media of claim 9 wherein:

a plurality of file offsets are provided to the single operation, one file offset for each block in the group;

wherein each file offset is an offset in a file from where reading of data is to begin.

12. The one or more storage media of claim 9 further comprising said structure storing the block-identifiers.

13. The one or more storage media of claim 9 comprising at least one of a disk, a chip and a cartridge.

14. The one or more storage media of claim 9 wherein:
the blocks are sorted during execution of said instructions to sort based on adjacency such that during performance of said single operation, block-identifiers of blocks physically adjacent to one another at a periphery of a disk in the storage device are presented at one time to the storage device and identifiers of blocks that are physically adjacent to one another and located closer to a center of the disk are presented at another time.

15. The one or more storage media of claim 9 further comprising: instructions to perform a write operation from said cache to said storage device when space is needed in said cache.

16. The one or more storage media of claim 9 further comprising: instructions to store a row of said table in a hash cluster.

17. The one or more storage media of claim 9 wherein said storage device comprises at least one of a disk, a chip and a cartridge.

18. A computer comprising a processor and one or more storage media coupled to the processor, the one or more storage media comprising:
instructions to automatically generate an array update operation based on a query to update a relational database;
instructions to automatically use a database index to look up a block-identifier of a block that contains a row identified by an identifier in a plurality of identifier and value pairs to be used to perform said array update operation on a table in said relational database;
instructions to automatically store the block-identifier in a structure in memory;
instructions to automatically repeat said instructions to automatically use and said instructions to automatically store, for all identifiers in at least a group of identifier and value pairs in said plurality;
instructions to automatically perform a vector read operation, to retrieve from a disk and store in a cache, each block in a group of blocks identified by block-identifiers stored in said structure, wherein the group of blocks are all stored in the cache during execution of a single function call;
wherein several of said blocks in the group are non-contiguous in said disk;
instructions to automatically modify a row in a block stored in the cache, using a value in the plurality of identifier and value pairs;
instructions to automatically repeat said instructions to automatically modify, with each row identified in the group of identifier and value pairs; and
instructions to sort said block-identifiers prior to retrieval of the blocks from the storage device by performing the vector read operation.

19. The computer of claim 18 wherein:
the blocks are sorted during execution of said instructions to sort based on adjacency such that block-identifiers of blocks physically adjacent to one another at a periphery of said disk are presented at one time to a disk drive comprising said disk and identifiers of blocks that are physically adjacent to one another and located closer to a center of said disk are presented at another time.

20. An apparatus comprising a database, the apparatus comprising:
means for generating an array update operation based on a query to update the database;
wherein said array update operation specifies a plurality of row-identifier and value pairs to update multiple rows in a table of the database;
means for using a database index to look up a block-identifier of a block that contains the row identified by an identifier in the plurality of identifier and value pairs;
means for storing the block-identifier in a structure in memory;
means for repeating (using the database index to look up and storing the block-identifier), for all identifiers in at least a group of identifier and value pairs;
means for invoking performance of a vector read operation without context switching, to retrieve from a disk and store in a cache, each block in a group of blocks identified by block-identifiers stored in said structure, wherein the group of blocks are all stored in the cache during execution of a single function call;
wherein several of said blocks in the group are non-contiguous in said disk;
means for modifying a row in a block stored in the cache, using a value in the plurality of identifier and value pairs; and
means for repeating said modifying with each row identified in the group of identifier and value pairs;
wherein said block-identifiers are sorted prior to retrieval of the blocks from the storage device by performing the vector read operation.

21. One or more storage media comprising instructions to perform a method implemented in a computer, the one or more storage media comprising:
instructions to generate an array update operation based on a query to update a database;
wherein said array update operation specifies a plurality of row-identifier and value pairs to update multiple rows in a table of said database;
instructions to find a block-identifier of a block that contains the row identified by a row-identifier in a row-identifier and value pair in said plurality, by use of a database index in said database;
instructions to store the block-identifier in a structure in memory;
instructions to repeatedly (find the block-identifier and store the block-identifier), for all row-identifiers in at least a group of row-identifier and value pairs in said plurality;
instructions to invoke performance of a vector read operation without context switching during said performance, to retrieve from a storage device and store in a cache, each block in a group of blocks identified by block-identifiers stored in said structure, wherein the group of blocks are all stored in the cache during execution of a single function call;
wherein several of said blocks in the group are non-contiguous in said storage device;
instructions to update the row in the block in the cache, using the value in the row-identifier and value pair;
instructions to repeatedly execute said instructions to update, with each row identified in the group of row-identifier and value pairs; and
instructions to sort said block-identifiers prior to retrieval of the blocks from the storage device by performing the vector read operation.

22. The one or more storage media of claim 21 further comprising: instructions to store a row of said table in a hash cluster.

23. The one or more storage media of claim 21 wherein said storage device comprises at least one of a disk, a chip and a cartridge.

* * * * *